United States Patent [19]

Fries

[11] Patent Number: 4,650,059

[45] Date of Patent: Mar. 17, 1987

[54] METHOD AND APPARATUS FOR ORIENTING BALLOONS

[75] Inventor: Timothy J. Fries, Rochester, N.Y.

[73] Assignee: National Latex Products Co., Ashland, Ohio

[21] Appl. No.: 805,555

[22] Filed: Dec. 6, 1985

[51] Int. Cl.⁴ .............................................. B65G 47/24
[52] U.S. Cl. ..................................... 198/389; 198/493
[58] Field of Search ................ 198/389, 398, 493, 786

[56] References Cited

U.S. PATENT DOCUMENTS

| 477,093 | 6/1892 | Wead | 198/389 |
| 2,904,162 | 9/1959 | Simer | 198/398 X |

Primary Examiner—Andres Kashnikow
Attorney, Agent, or Firm—Cumpston & Shaw

[57] ABSTRACT

A method and apparatus is disclosed for arranging balloons or the like in a nozzle-up orientation. The apparatus comprises a pair of downwardly inclined, elongate members, at least one of which has an upwardly movable surface, such as the surface of a rotatable roller. The members define a gap therebetween, and a row of spaced, unoriented balloons are fed at random, some with the baggy body leading and others with the less baggy nozzle leading, into the gap at the upper end of the members from below or the underside thereof. A baggy body leading balloon is advanced upwardly by the roller through the gap and discarded, whereas only the nozzle of each less baggy nozzle leading balloon is advanced through the gap. The nozzle leading balloons then slide down the members all arranged in a nozzle-up orientation.

21 Claims, 5 Drawing Figures

METHOD AND APPARATUS FOR ORIENTING BALLOONS

BACKGROUND OF THE INVENTION

1. Field of the Invention

This invention relates generally to article orienting apparatus, and more specifically to a method and apparatus for arranging balloons or the like in a predetermined nozzle-up orientation.

2. Description of the Prior Art

Sorting apparatus is known in the art for sorting round articles of varying diameter into separate bins. The apparatus comprises a pair of downwardly inclined cylindrical fixed or rotating members defining a gap therebetween increasing from the upper end to the lower end. Articles of varying diameter are fed from above the members into the gap at the upper end of the members, roll down the members, and fall through the members when the gap width therebetween slightly exceeds the diameter of an article. Bins are provided beneath and along the length of the members to catch articles of varying diameter as they fall through the members.

It is also known in the art to orient articles by the use of air pressure. For example, lids having a cupped rim or skirt can be oriented by directing a stream of air against the lid to flip "skirt down" articles to a "skirt up" position without affecting articles already in the "skirt up" position. In this case, the lids have the characteristic configuration of the cupped rim or skirt, and the air nozzle can be positioned to direct an air stream to contact an outer portion of the skirt to induce a flipping action thereto. When the article is already in the "skirt up" position, on the other hand, the air stream acts upon a lesser area, resulting in only a slight lifting action which is not sufficient to flip the "skirt up" article.

The above-described prior art mechanisms are apparently suitable for orienting articles and lids having the required rigid surface configurations. However, such mechanisms are not suitable for orienting flexible articles, such as balloons or the like, each having a baggy body and a less baggy nozzle. The present invention has particular utility for orienting flexible articles, such as balloons.

SUMMARY OF THE INVENTION

In accordance with a preferred embodiment of the present invention, a method and balloon orienting apparatus are disclosed for arranging balloons in a predetermined nozzle-up orientation; that is, with the nozzle ends all positioned in the same direction. The apparatus comprises a pair of members inclined downwardly at an angle to the horizontal, at least one of which has an upwardly movable surface. The members define a gap therebetween of a width slightly less than the less baggy balloon nozzle. Means are provided for feeding an unoriented row of spaced apart balloons at random, some with the baggy body end leading and others with the less baggy nozzle end leading, into the gap between the upper end of the members from the underside of the members. Each baggy body leading balloon is drawn up into and through the gap by the movable member(s) and then falls off of the members. Only the nozzle of each less baggy nozzle leading balloon is drawn up into and through the gap. The nozzle leading balloons then slide down the members to the lower end thereof all arranged in a nozzle-up orientation.

In another aspect of the invention, the member having the upwardly movable surface comprises a rotatably mounted roller. Preferably, both members comprise rotatably mounted, smooth surfaced steel rollers.

In a more specific aspect of the invention, the feeding means comprises a V-shaped vibratory track having one end thereof adjacent the underside of the upper end of the rollers and in alignment with the gap. The apparatus further has air jet means at the underside of the track end for directing a jet of air against the underside of the leading ends of the balloons to assist introduction of the leading ends into the gap between the rollers. The apparatus further has air stream means adjacent the upper side of the rollers for directing an air stream across the gap to assist body leading balloons to fall from the rollers on one side thereof.

In another aspect of the invention, one of the rollers is tilted relative to the other; that is, spaced from a horizontal plane along its length shorter distances than corresponding parts of the other roller to assist body leading balloons to fall from the rollers on one side thereof. Conveyor means are provided to catch the falling balloons and to convey them back to the vibratory track via a vibratory bulk feeder and recycler.

A primary advantage of this invention is to provide a method and apparatus for orienting flexible articles, such as balloons or the like, in a row in spaced relation with the nozzle ends of the balloons all positioned in the same orientation. This facilitates automatically handling the balloons by eliminating prior manual operations. For example, in a known balloon printing operation, each balloon is manually removed from a hopper and placed on one of a plurality of inflation nozzles mounted on a rotating plate which inflates the balloon and positions it for printing. With the present invention, the balloons are automatically oriented with the balloon nozzles positioned in the same upward direction. Conventional transfer means, not shown, can be designed to operate in synchronized relation to the balloon orienting device to engage, transfer and place each nozzle end onto an inflation nozzle, thereby automating the entire balloon printing operation. Although the present invention has particular utility in orienting balloons, it conceivably has utility in handling any flexible article of the type having one end of baggy material and an opposite end of less baggy material.

In addition to the use of this invention in the balloon printing operation, other possible applications for this invention may be, for example, counting balloons, packaging balloons, inspecting balloons, silk screening of balloons, inflating balloons, sorting of mixed balloons and transferring balloons from one location to another in a predetermined orientation.

The invention and its advantages will become more apparent from the detailed description of the invention presented below.

BRIEF DESCRIPTION OF THE DRAWINGS

In the detailed description of the invention presented below, reference is made to the accompanying drawings, in which.

DETAILED DESCRIPTION OF THE INVENTION

Figure 1:
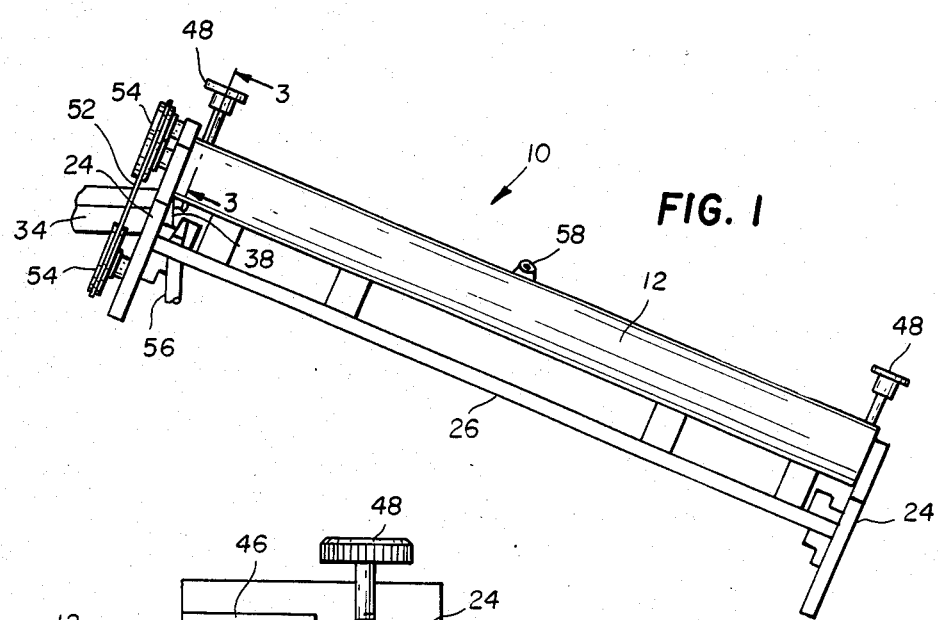
FIG. 1 is a side elevational view of a preferred embodiment of the flexible article orienting device of this invention.
Figure 5:
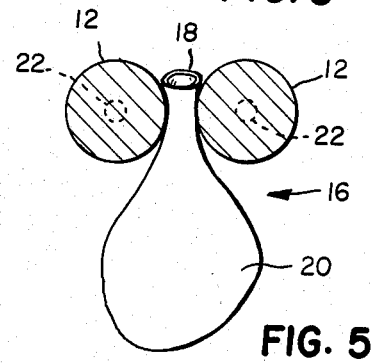
FIG. 5 is a section view similar to FIG. 4 showing the manner in which correctly oriented balloons are carried by the rollers.
Figure 2:
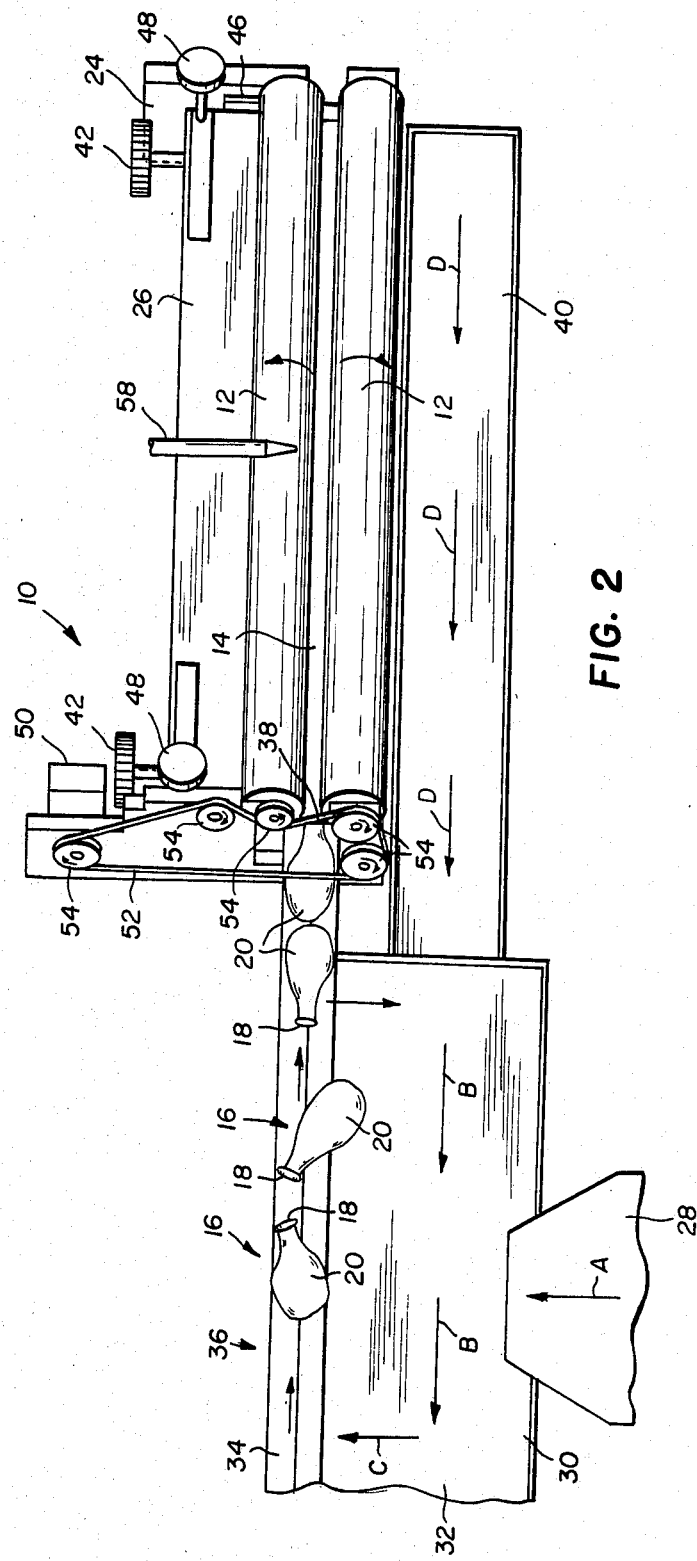
FIG. 2 is a top plan view of the article orienting device of FIG. 1 including means for feeding balloons one at a time into the orienting device.

Referring now to FIGS. 1, 2 and 5 of the drawings, a preferred embodiment of the flexible article orienting device 10 of this invention is shown comprising a pair of downwardly inclined rollers 12 defining a gap 14 therebetween. This orienting device is particularly useful for orienting balloons 16 in a row with all of the nozzles 18 thereof pointing in the same nozzle-up direction.

Although designed specifically to arrange balloons 16 having a baggy body portion 20 and a less baggy nozzle portion 18 in a desired orientation, it should be understood that the orienting device 10 could conceivably operate satisfactorily to orient any flexible article of the type having one end portion of baggier material than its opposite end portion. The baggier flexible material exerts a greater lateral force on rollers 12 as it is drawn up into gap 14 between the rollers, and hence, a greater length of the article will be drawn up into and through the gap due to this greater frictional force. On the other hand, when the opposite end portion of the less baggy material is fed upwardly into gap 14 between rollers 12, a smaller length of the material will be drawn up into and through the gap due to the smaller lateral force exerted on the rollers. It is primarily this difference in lateral force exerted on rollers 12 that results in a greater length of the baggier material to be drawn through the rollers than the less baggy material. As shown in FIG. 5, when the less baggy nozzle end of a balloon is drawn into the nip between the rollers, the balloon rides in the nip with the nozzle above the centerline between the rollers and the baggy end below. Accordingly, by properly selecting or adjusting the operating parameters of the orienting device, for example, the width of gap 14 between rollers 12, the size or bagginess of the opposite end portions of the flexible articles to be oriented, the roller surface material, the angle of inclination of rollers 12 relative to the horizontal, and the rotational speed of the rollers, the orienting device will draw the baggier end portion of a flexible article which is fed into gap 14 completely through the rollers and discard it. If the less baggy end portion of the flexible article is fed into the gap, it will only be partially drawn through the rollers and will, due to roller force and gravity, emerge at the lower ends of the rollers in a predetermined orientation.

Figure 3:
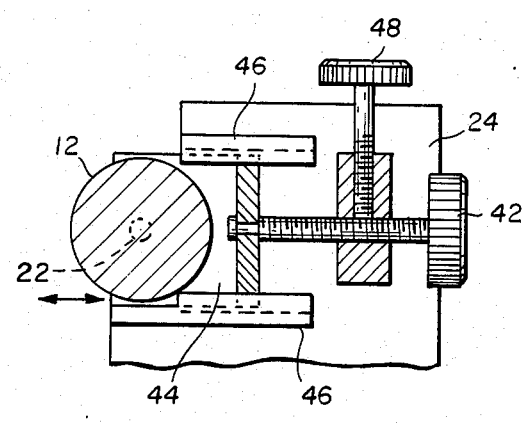
FIG. 3 is an enlarged view in section taken substantially along line 3—3 of FIG. 1 showing one embodiment of the roller gap adjusting means.

In a preferred embodiment of this invention, rollers 12 are smooth, polished chrome plated steel rollers having stub shafts 22 at the ends thereof, one of which is shown dotted in FIG. 3, rotatably mounted in side frame members 24 of a support frame 26. However, it should be understood that by varying the operating parameters, it is possible that rollers 12 of other materials and surface finish could be successfully used.

The apparatus for feeding balloons 16 to orienting device 10, as best seen in FIG. 2, comprises a conventional vibratory bulk feeder 28, shown only in part. Balloons 16 of a selected size are dumped into bulk feeder 28 which vibrates and feeds the balloons in a direction indicated by arrow A onto the platform of a vibratory recycler 30. The recycler feeds the balloons 16 in a direction indicated by arrows B to a tilted end 32 thereof where they slide due to gravity in the direction of arrow C into a V-shaped track 34 of a vibratory conveyor 36 adjacent recycler 30. The balloons 16 that land cross-wise of V-shaped track 34 are vibrated off the track and back onto the recycler. The balloons 16 that land in or partially in V-shaped track 34 are vibrated along and into the track to form a row of spaced unoriented balloons in which either the baggy body end 20 or less baggy nozzle 18 is leading. Track end 38 is located below and adjacent the upper end of rollers 12, and is adapted when vibrating to feed the baggy or less baggy ends 20, 18 respectively, into gap 14 between rollers 12. In those instances where the baggy end 20 of the balloon is leading, the baggy end is drawn into and through the gap between the rotating rollers due to, among other things, the force exerted by the baggy material against the rollers. The baggy end leading balloons are drawn completely through rollers 12 before they reach the lower end of the rollers and fall, due to gravity, off rollers 12 and onto any suitable conveyor 40. The conveyor transports the fallen balloons 16 in the direction of arrows D back to recycler 30. In those instances where the less baggy end 18 of balloon 16 is leading, the less baggy material is only partially drawn into gap 14 as shown in FIG. 5 and travels down to the lower end of rollers 12 with the less baggy or nozzle end 18 thereof in an upward direction. Apparatus, not shown, is provided at the lower end of rollers 12 to handle ballons 16 as they feed off the rollers. Such apparatus may comprise, for example, an accummulator, not shown, for accumulating the balloons in a nozzle-up orientation, or a transfer mechanism for transferring each of the nozzle-up oriented balloons 16 onto a balloon inflating work station, or the like.

In order for the balloon orienting device 10 to operate satisfactorily, several variables have to be taken into account, such as, for example, the smoothness of rollers 12, the size of gap 14 between the rollers, the rotational speed of the rollers, the balloon bagginess at the opposite ends thereof, and the distance between track end 38 and rollers 12. The gap size is adjustable by conventional means such as an adjusting bolt 42 (FIG. 3) on each side frame member 24 for slidably moving an L-shaped plate 44 which rotatably supports roller shaft 22. The plates 44 are slidable within guideways 46 on frame members 24 and move rollers 12 toward or away from one another upon movement of adjusting bolts 42. Lock screws 48 are provided for locking bolts 42 in a selected gap position. The rotational speed of rollers 12 is adjustable by a suitably variable D.C. motor 50 which drives rollers 12 via an "0" ring 52 trained over pulleys 54, as best seen in FIG. 2.

The above-mentioned variables, in turn, may be affected by the use of air assists in the form of an air nozzle 56 (FIG. 1) to direct an air jet for feeding the baggy or less baggy ends 20, 18 respectively, of the balloons up into gap 14 or an air nozzle 58 to direct an air stream to assist blowing balloons 16 from rollers 12. The air jet or stream is formed by any suitable air blower, not shown, which directs the air through the properly positioned nozzles 56, 58. Other air assists, not shown, may be used in conjunction with the vibratory balloon handling feeder 28, recycler 30 and track 34 to assist movement of, for example, (1) balloons 16 from bulk feeder 28 recycler 30, (2) balloons 16 from recycler 30 into vibratory track 34, (3) cross-wise balloons 16 off of track 34 into recycler 30, and (4) balloons 16 partially overhanging side edges of V-shaped track 34 into the track.

Figure 4:
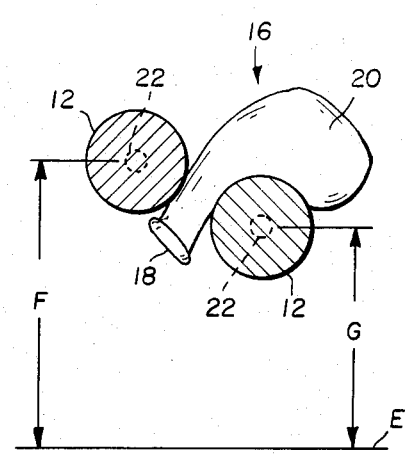
FIG. 4 is a section view showing the rollers arranged to assist flexible articles to fall off the rollers, the remainder of the article orienting device and feeding means being omitted for purposes of clarity.

With reference to FIG. 4, another embodiment of the invention is disclosed in which one of the parallel rollers 12 is spaced from a horizontal plane E along each point of its length a distance F that is longer than distance G of a corresponding part of the other roller. This roller orientation causes or assists balloons 16 drawn through gap 14 with baggy end 20 leading to tilt and fall from the rollers on one side thereof onto conveyor 40.

Although a pair of oppositely rotating, smooth steel rollers 12 are preferred for generating an upward moving balloon engaging surface, it is conceivable that the balloon orienting device 10 could operate successfully if rollers 12 were constructed of other materials, such as rubber or plastic, or if only one roller were used, the other member being fixed. Also, it is conceivable that one or both rollers 12 could be replaced by a vibrating upwardly moving roller or surface generated by eccentric rollers driven at a high rotational speed.

In accordance with an alternative embodiment of the invention (not illustrated), horizontally disposed rollers are vibrated to cause the oriented articles to travel in a predetermined direction along the length thereof. Vibratory apparatus of the same kind as employed in well known vibratory feeders may be usefully employed.

The invention has been described in detail with particular reference to preferred embodiments thereof, but it will be understood that variations and modifications can be effected within the spirit and scope of the invention.

What is claimed is:

1. A method for orienting flexible articles, such as balloons or the like having a body end of baggy material and a nozzle end of less baggy material comprising the steps of:
    positioning a pair of members, at least one of which is rotatable, in downwardly inclined relation at an angle to the horizontal, said members defining a gap therebetween of a predetermined width slightly less than the bagginess of the nozzle end of the balloon; and
    feeding body or nozzle leading ends of a plurality of balloons one at a time at random into said gap at the upper ends of said members from the underside thereof whereby (1) the baggy body of each body leading balloon is drawn upwardly by said rotable member into and completely through said gap causing the body leading balloon to fall off the members, and (2) only the less baggy nozzle of each nozzle leading balloon is drawn upwardly by said rotatable member into and through the gap, the nozzle leading balloons then moving along said members to the lower end of said members all arranged in nozzle-up oriented relation.

2. A method for orienting flexible articles according to claim 1 comprising prior to the feeding step, the step of forming an unoriented row of balloons in spaced apart random relation in which either the body end or nozzle end is leading.

3. A method for orienting flexible articles according to claim 2 comprising the further step of directing a jet of air against the underside of said leading ends of the balloons to assist introduction of said leading ends into said gap.

4. A method for orienting flexible articles according to claim 2 comprising the further step of directing an air stream across the upper side of said members and said gap to assist body leading balloons to fall from said members.

5. A flexible article orienting device for flexible articles such as balloons or the like having a body end of baggy material and a nozzle end of less baggy material comprising:
    a pair of spaced apart members at least one of which has an upwardly movable surface, said members defining a gap therebetween of a width slightly less than said less baggy nozzle material; and
    means for feeding an unoriented row of articles at random with either the body end or nozzle end leading into the gap between said members from the underside thereof whereby (1) each body end leading article is drawn up into and substantially completely through said ga by said movable members and then falls off the members, and (2) only the nozzle of each nozzle end leading article is drawn up and through the gap by said movable member in nozzle-up oriented relation.

6. A flexible article orienting device according to claim 5 wherein said pair of spaced-apart members is inclined downwardly at an angle to the horizontal and wherein said means for feeding an unoriented row of articles is disposed adjacent the upper end of said pair of spaced apart members and said nozzle end leading members are carried downwardly to the lower end of said members.

7. A flexible article orienting device according to claim 5 wherein said one member comprises a rotatably mounted roller.

8. A flexible article orienting device according to claim 7 wherein said roller is a smooth steel roller.

9. A flexible article orienting device according to claim 5 wherein both of said members comprise rotatably mounted rollers.

10. A flexible article orienting device according to claim 5 wherein said feeding means comprises a vibratory track having one end thereof adjacent the underside of said rollers at the upper end thereof and in alignment with said gap.

11. A flexible article orienting device according to claim 10, and further comprising air jet means at the underside of said one end of said track for directing a jet means at the underside of said one end of said track for directing a jet of air against the underside of the leading ends of the articles to assist introduction of the leading ends into the gap between said rollers.

12. A flexible article orienting device according to claim 9 wherein one of said rollers is spaced from a horizontal plane along its length shorter distances than corresponding parts of the other of said rollers to assist body leading articles to fall from said rollers on one side thereof.

13. A flexible article orienting device according to claim 9, and further comprising air stream means adjacent the upper side of said rollers for directing an air stream across said gap to assist body leading articles to fall from said rollers on one side thereof.

14. A flexible article orienting device according to claim 9, and further comprising means associated with said rollers for adjusting said gap between said rollers.

15. A flexible article orienting device according to claim 9 wherein said feeding means comprises a V-shaped vibratory track having one end thereof adjacent the underside of said rollers and in alignment with said gap, said article orienting device further comprising air jet means at the underside of said one end of said track for directing a jet of air against the underside of the leading ends of the articles to assist introduction of the leading ends into the gap between said rollers, air stream means adjacent the upper side of said roller for directing an air stream across said gap to assist body end leading articles to fall from said rollers on one side thereof, means associated with said rollers for adjusting said gap between said rollers, and conveyor means to catch the falling articles and to convey them back to said vibratory track.

16. A method for orienting flexible objects comprising:

forming a gap between two spaced apart members at least one of which has an upwardly moving surface adjacent said gap, said gap being narrower than the widest dimension of said object;

feeding a succession of said objects into said gap from below whereupon incorrectly oriented objects are carried substantially completely through the gap while correctly oriented objects are carried only partly through the gap; and removing misoriented objects from the gap from above while leaving correctly oriented objects in the gap.

17. The method of claim 16 further comprising inclining said members and feeding said objects at the higher end whereby the correctly oriented objects move downwardly along said members for removal at the lower end.

18. The method of claim 16 wherein said members are spaced-apart rollers and further comprising the step of rotating at least one of said rollers around an axis substantially parallel to said gap.

19. The method of claim 16 comprising rotating both of said rollers.

20. The method of claim 18 comprising inclining said rollers and feeding said objects at the upper end whereby the correctly oriented objects move downwardly along said rollers for removal at the bottom end.

21. The method of claim 16 wherein said feeding step comprises directing a jet of air at said objects to feed them into said gap.

* * * * *